Oct. 17, 1972   R. A. RAPP   3,699,032
DEVICES FOR THE CONTROL OF AGENTS IN FLUIDS
Filed June 20, 1969   2 Sheets-Sheet 2

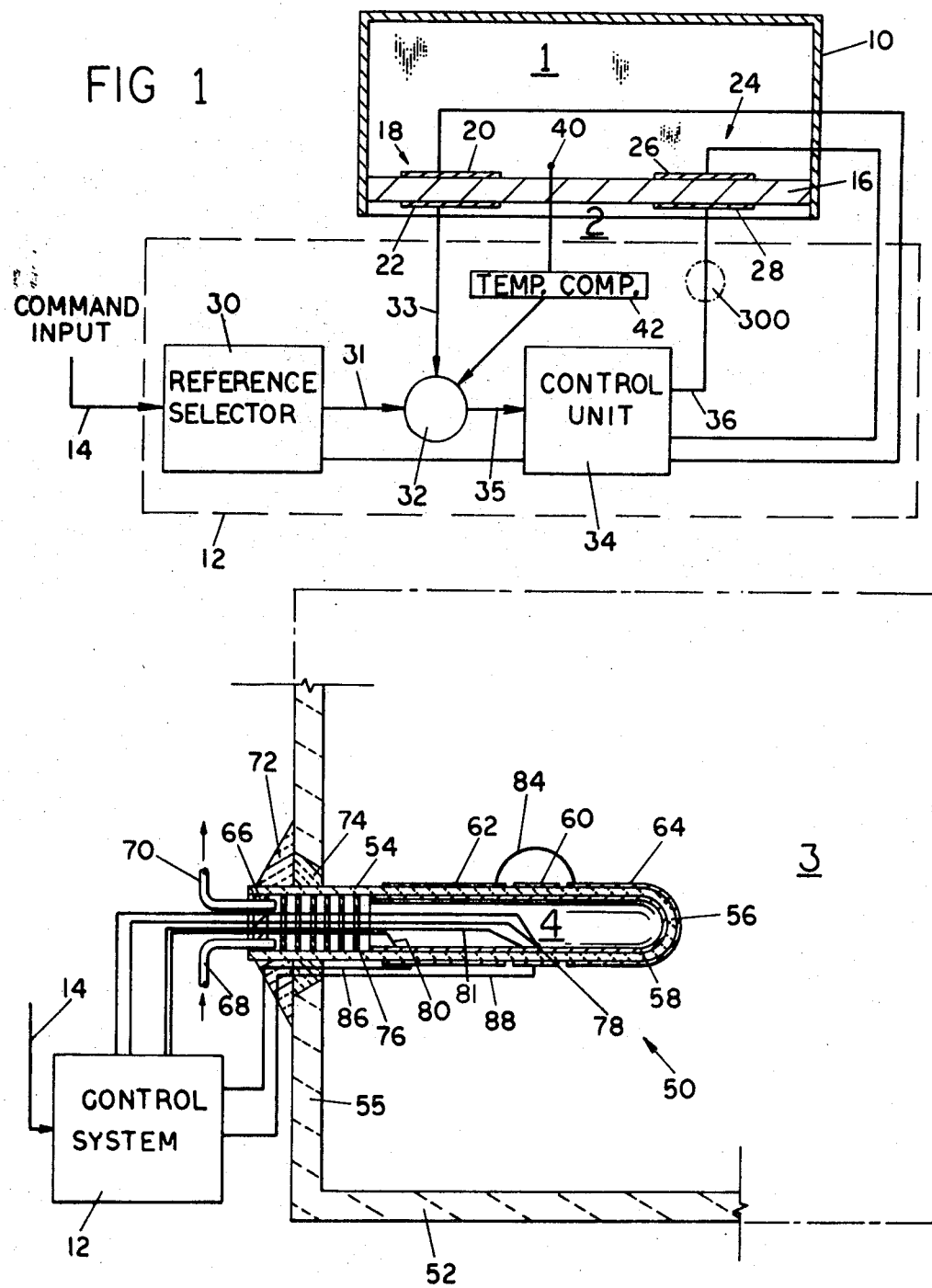

INVENTOR.
ROBERT A. RAPP
BY Frank H Foster
ATTORNEY

United States Patent Office 3,699,032
Patented Oct. 17, 1972

3,699,032
DEVICES FOR THE CONTROL OF AGENTS
IN FLUIDS
Robert Anthony Rapp, Westerville, Ohio, assignor to The
Ohio State University, Columbus, Ohio
Filed June 20, 1969, Ser. No. 835,191
Int. Cl. B01k 3/00
U.S. Cl. 204—195 S                               1 Claim

ABSTRACT OF THE DISCLOSURE

A control apparatus having a cylindrical tube at elevated temperatures having walls formed of solid electrolyte with an inner cylindrical electrode on its inner wall and a pair of outer cylindrical electrodes spaced from each other on the outer wall. The inner electrode and one outer electrode, separated by the solid electrolyte, form a galvanic measuring cell for providing a voltage proportional to the natural logarithm of the ratio of the oxygen partial pressure within the tube and the oxygen partial pressure outside of the tube. The other outer electrode, together with the inner electrode and the interposed solid electrolyte, form a pumping cell on which a voltage is impressed to cause transport of oxygen through the pumping cell by coulometric titration. This movement of oxygen effects changes in the oxygen partial pressure either inside or outside the tube as desired. A control system is electrically connected to both of the cells and has a command input for selecting the desired oxygen partial pressure for the chamber in which the oxygen activity is to be controlled. The control system provides a voltage on the pumping cell which is derived from the command input and the measuring cell voltage in order to bring the oxygen partial pressure either within or without the tube toward the desired oxygen partial pressure.

BACKGROUND OF THE INVENTION

The invention relates to an apparatus for controlling the ionizable agent content of a fluid, and more particularly relates to a solid electrolyte measuring cell and a solid electrolyte pumping cell used with a control system to simultaneously measure the agent content of a controlled fluid and to pump the agent into or away from the controlled fluid in order to bring its agent content to a desired level.

Controlling the quantity of an agent, such as oxygen, contained within a fluid is currently done in a variety of ways in laboratories and in industrial applications. In laboratories, a mixture of gases in a desired proportion is otbained by carefully flowing together the component gases having precisely measured and controlled flow rates. Separate flow meters are required for each component gas. In industrial applications, such agents might be controlled by the use of carefully metered buffering gas mixtures, such as $H_2+H_2O$ or $CO+CO_2$ to fix a thermodynamically defined oxygen activity, or $CH_4+H_2$ or $CO+CO_2$ to fix a carbon activity, $NH_3+H_2$ to fix a nitrogen activity, and so forth.

Individual solid oxide electrolyte cells have been used to measure the oxygen partial pressure of oxygen in a gas by providing a voltage corresponding to the ratio of the oxygen activity of the unknown gas and the oxygen activity of a reference gas. More particularly, the correspondence is that the voltage is directly proportional to the natural logarithm of that ratio. Instruments for accomplishing such measurements are currently commercially available.

Individual solid electrolyte cells have also been used for the coulometric titration of oxygen. For coulometric titration, a voltage may be applied to the electrodes which, depending on its magnitude and polarity, can cause the transport of oxygen from one electrode of the cell to the other.

Such measuring and coulometric titration pumping cells for oxygen are disclosed in the patent to Ruka—U.S. 3,400,054. The most popular solid oxide electrolytes are solid solutions of zirconia ($ZrO_2$), or thoria ($ThO_2$) which may be doped with from 6 to 25 cation percent $Y_2O_3$, CaO, MgO, $La_2O_3$, or $Sm_2O_3$, etc. The doped oxides provide vacant oxygen ion lattice sites over which oxygen ions can move.

The electronically conducting electrodes are porous or permeable. For chambers containing oxygen gas, free oxygen gas molecules ionize by acquiring electrons from one electrode, are transported from site to site through the solid electrolyte to its opposite side, and there give up electrons and reform $O_2$ molecules. In metallic solutions, the oxygen solvent is in atomic form but the electrode reactions are analogous.

It is an object of the invention to provide an improved apparatus for controlling the ionizable agent content of a controlled fluid.

A further object of the invention is to provide an apparatus for controlling the ionizable agent content of a controlled fluid, which apparatus is less expensive and more precise than obtainable by previous methods and apparatus.

A further object of my invention is to provide an apparatus for continuously and automatically controlling the ionizable agent content of a controlled fluid by a system which continuously monitors the existing agent content and modifies it toward a desired agent content.

A further object of my invention is to provide a device for measuring the reaction rate of an agent with a reactant.

A further object of the invention is to provide an apparatus for automatically controlling the ionizable agent content of a continuously flowing controlled fluid.

Further objects and features of my invention will be apparent from the following specification and claims when considered in connection with the accompanying drawings illustrating several embodiments of my invention.

SUMMARY OF THE INVENTION

I have found that the above and other objects can be attained in an apparatus for controlling the ionizable agent content of a controlled fluid. The apparatus has a solid electrolyte measuring cell which forms a partition between a controlled fluid and a reference fluid. The measuring cell provides a voltage corresponding to the ratio of the agent content of the controlled fluid and the agent content of the reference fluid. A solid electrolyte pumping cell is also provided which forms a partition separating the controlled fluid from a reservoir fluid. A pumping voltage impressed on the pumping cell causes transport of agent through the cell at a rate corresponding to the magnitude and polarity of that pumping voltage. A control system is used which is connected to the measuring cell and to the pumping cell and which has a selector for choosing the agent content desired in the controlled fluid. The control system provides a voltage on the pumping cell for transporting the agent through the pumping cell in order to bring the agent content of the controlled fluid to the desired agent content. The voltage which the control system impresses on the pumping cell is derived from the voltage of the measuring cell and from the selected desired agent content. Optionally, a temperature measuring and comparing device is also incorporated into the control system to provide compensation for temperature fluctuations in the measuring cell about the desired cell temperature.

DESCRIPTION OF THE VIEWS

FIG. 1 is a diagrammatic view illustrating some of the fundamental principles of the invention;

FIG. 2 is a view in side elevation and partly in vertical section illustrating an embodiment of my invention for controlling the agent content of a relatively large container;

Figure 3:
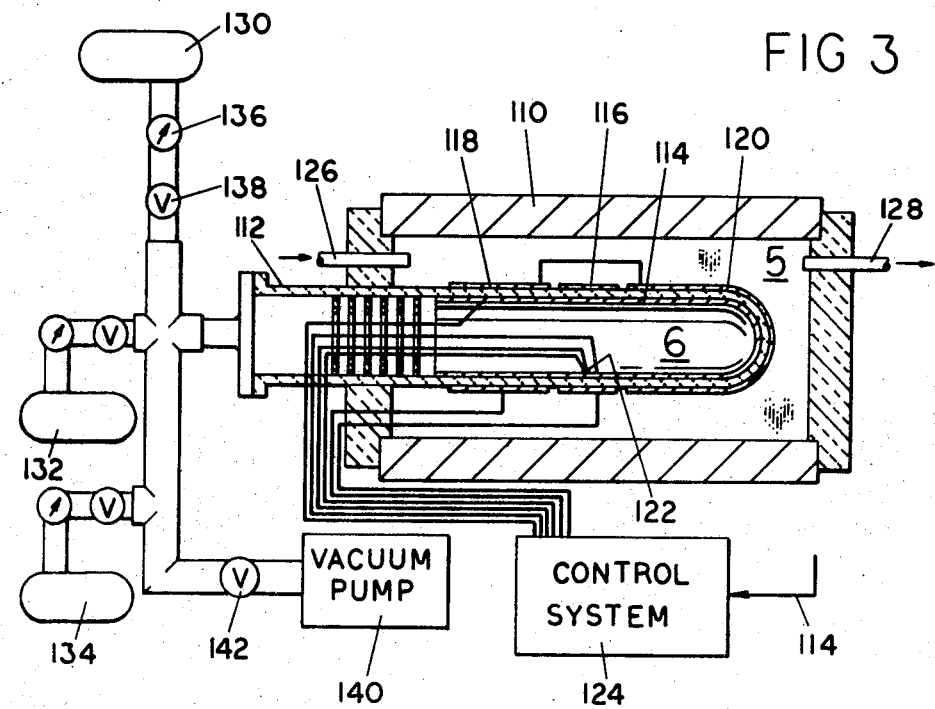
FIG. 3 is a view in side elevation partly in vertical section illustrating an embodiment of my invention for providing a controlled fluid within the small compartment of an electrolyte tube interior.

In describing the preferred embodiments of the invention illustrated in the drawings, specific terminology will be used for the sake of clarity. However, it is not intended to be limited to the specific terms so selected, and it is to be understood that each specific term includes all the technical equivalents which operate in a similar manner to accomplish a similar purpose.

DETAILED DESCRIPTION

In FIG. 1, I illustrate diagrammatically an electrochemical device illustrating the principles of my invention. The device is an apparatus for controlling the ionizable agent content of a controlled fluid in response to a command input desired content for the controlled fluid. Basically, the apparatus includes a container 10 for containing a fluid 1 with controlled agent at a partial pressure (activity) of $P_1$ within its bounds, and separating the contained fluid 1 from the external fluid 2 with controlled agent at a partial pressure (activity) $P_2$. The fluid 2 might be air if oxygen is being controlled, or it might be any phase which can contain controlled agent. A control circuit indicated generally by the dashed lines 12 is connected to structures of the container 10 so that the agent content of either fluid 1 or fluid 2 may be controlled at the level selected at the command input 14. The system then transports ionizable agent either from fluid 1 to fluid 2 or from fluid 2 to fluid 1 in order to accomplish the desired agent content for whichever fluid is to be controlled.

Referring to FIG. 1 in more detail, the container 10 includes an impervious solid electrolyte partition 16 which separates the body of fluid 1 from the body of fluid 2. A solid electrolyte measuring cell 18 is formed on the partition 16 by a first electrode 20 on one wall of the partition 16 and in contact with the fluid 1, and a second electrode 22 on the opposite wall of the partition 16 and in contact with the fluid 2. I use the word "cell" to mean a pair of electrodes having an interposed electrolyte. The measuring cell 18 is used as a galvanic measuring cell which provides a voltage between the electrodes 20 and 22 which corresponds to the ratio of the agent content at $P_1$ and the agent content at $P_2$. A second cell 24 is similarly formed on the partition 16 and has electrodes 26 and 28 in contact with the fluids 1 and 2 respectively. The second cell 24 operates as a pumping cell to transport ionizable agent through the pumping cell and the partition 16 at a rate and in a direction corresponding to a voltage impressed between the electrodes 26 and 28.

Either the fluid 1 or the fluid 2 could be the controlled fluid which is to be brought to a desired ionizable agent content. If fluid 1 is the controlled fluid, then fluid 2 provides a reference fluid for the measuring cell 18, and a reservoir fluid for agent pumped through the pumping cell 24. It is obvious that the chamber containing fluid 2 could have two separate chambers so that fluid 2 could be two separate fluid bodies, one providing the reference fluid for the measuring cell 18, the other providing a reservoir fluid for the pumping cell 24. However, I have found this impractical and unnecessary, and prefer that a single body of fluid such as fluid 2, as illustrated, be used for both the reference fluid and the reservoir fluid.

The control circuit means 12 is electrically connected to the measuring cell 18 and to the pumping cell 24. The control means 12 includes a reference selector 30 for selecting, with a command input 14, a desired agent content for the controlled fluid. The reference selector 30 provides a reference signal 31 at an adding and comparing means 32. The voltage from the electrodes 20 and 22 of the measuring cell 18 is similarly applied to the adding and comparing means 32 at the input 33. The output 35 from the adding and comparing means 32 is fed to a control unit 34 which provides a pumping voltage at its output 36 on the pumping cell 24. Thus, the purpose of the control means 12 is to provide a voltage on the pumping cell 24 which is derived from the command input 14 and from the measuring cell 18 voltage in order to change the agent content of the controlled fluid, which might for example be fluid 1, toward the desired agent content by the process of coulometric titration.

The fluids 1 and 2 can be stagnant or flowing fluids and can be gas or liquid or mixed condensed phases. The embodiments I prefer utilize oxygen as the ionizable agent which is controlled. The oxygen ion conducting solid oxide electrolyte which I prefer is zirconia, $ZrO_2$, doped with $Y_2O_3$ or CaO. These electrolytes have been found to exhibit the desirable property of relatively high oxygen ion conduction with relatively low electronic conduction at temperatures between 600° C. and 1600° C. However, I intend only to present oxygen as one possible agent which can be controlled according to my invention. Other electrolytes are known which can conduct ions of other agents in an analogous manner. For some of these other electrolytes, doping is optional. So, for example, the following is a non-exhaustive table of agent and electrolyte systems which can be adapted to my invention:

| Agent: | Electrolyte |
|---|---|
| $F^-$ | $CaF_2$ |
| $Cl^-$ | $BaCl_2$ |
| $Br^-$ | $BaBr_2$ |
| $Cu^+$ | $CuCl$ |
| $Ag^+$ | $AgI$ |

The preferred electrodes used in making the cells 24 and 18 are porous platinum electrodes painted on the surface of the solid electrolyte partition 16. Of course, if an electronically conducting fluid is used, such as a liquid metal, the fluid itself can function as the electrode, and electrical contact can be made to such a fluid electrode elsewhere in the fluid body.

A more detailed listing of electrolytes and their properties and applications will be found in Techniques in Metals Research, vol. IV, edited by Robert A. Rapp, Chapter VI C Solid Electrolyte Cells by R. A. Rapp and D. H. Shores, published by Interscience Publications.

In FIG. 1, I also show means for providing temperature compensation for the control means 12. Such means can include a thermocouple 40 which is connected to temperature compensating circuitry 42 to provide a signal at the adding and comparing means 32 in order to compensate for temperature variations at the measuring cell 18. The specific circuitry for the control means 12 is not shown in detail because, in view of the description given above, it can easily be designed by one of ordinary skill in the control art after having been given the mathematical relationships for the electrolyte cells which I give below.

In FIG. 2, I illustrate a preferred embodiment of my invention for controlling the oxygen pressure in an enclosed fluid environment which is external of the apparatus 50 which is a part of an embodiment of my invention. A fluid container 52, which might be a furnace or other chamber heated to a temperature of from 600° C. to 1600° C., is provided for containing the controlled fluid 3 having an oxygen activity $P_3$. A hollow tube 54 having walls of solid electrolyte is mounted through a wall 55 of the fluid container 52. The inner end 56 of the tube 54 is closed. A first permeable platinum electrode 58 is painted on the inner wall of the tube 54. An annular permeable platinum measuring electrode 60 is painted on the outer wall of the tube 54 opposite a portion of the first electrode 58. The measuring electrode 60 and the opposite portion of the first electrode 58 separated by the solid electrolyte of the tube 54 form the measuring cell for providing a voltage corresponding to the ratio of the oxygen content of the controlled fluid 3 and a reference and reservoir fluid 4 contained within the tube 54. A pair of annular permeable platinum pump electrodes 62 and 64 are similarly painted on the outer wall of the tube 54 opposite another portion of the first electrode and are spaced from opposite sides of the measuring electrode 60.

The opposite end of the tube 54 is provided with a closure 66 through which are provided a reference gas inlet 68 and a reference gas outlet 70. Because of the temperatures involved, I also provide suitable thermal insulation 72 and 74, and circular radiation shields such as 76. A temperature sensing thermocouple 78 is provided within the tube 54 and it, together with lead wires 80 and 81 from the inner electrode 58, is connected to the control system 12. I prefer to use separate wires 80 and 81 for the pumping and measuring portions of the inner electrode 58 so that large pumping currents and the consequent voltage drop across the wires cannot affect the measuring cell voltage received by the control system. The two spaced pumping electrodes 62 and 64 are connected together by a wire 84 and are connected to the control system by a lead wire 86. Another conductor 88 connects the measuring electrode 60 to the control system.

The operation of the device illustrated in FIG. 2 is similar to the operation of the device illustrated in FIG. 1. The contents of the fluid container 52, including the electrolyte tube 54, are heated to the requisite temperature range, and the desired command input 14 is selected at the control system. Oxygen is transported by coulometric titration between the inner electrode 58 and the pumping electrodes 62 and 64, either into or out of the controlled fluid 3, until the measuring cell (comprising the measuring electrode 60 and the inner electrode 58) detects that fluid 3 has attained the desired oxygen partial pressure.

The above described device illustrated in FIG. 2 might be used to control the oxygen content or activity in industrial annealing furnaces which require a low $^-P_{O_2}$ (low dew point) hydrogen gas, to control the $P_{O_2}$ in carbon-oxygen gases used to carburize or decarburize metals, to control the oxygen level in fused salts, glasses, oil, liquid metals or metal heating baths.

In FIG. 3, I illustrate an embodiment of my invention for controlling the gaseous environment of a relatively small chamber which is useful for laboratory purposes. A small tube furnace or other heated chamber 110 is utilized to heat the enclosed closed-end solid electrolyte tube 112 to the requisite temperature range of 600° C. to 1600° C. A separate temperature control will be provided therefor. The electrode structure on the electrolyte tube 112 is similar to the electrode structures illustrated in FIG. 2. An inner electrode 114 is provided adjacent the inner wall of the electrolyte tube 112, and an annular measuring electrode 116 and a pair of spaced pumping electrodes 118 and 120 are provided adjacent the outer wall of the electrolyte tube 112. A temperature sensing thermocouple 122 is provided within the electrolyte tube 112. The preferred position for the thermocouple is near the measuring cell. Conductors from the thermocouple and from the electrodes are connected to the control system 124. The heating chamber 110 is provided with a reference gas inlet 126 and a reference gas outlet 128. Thus, the reference and reservoir gas 5 is external of the tube 112 and the controlled gas 6 is within the tube 112.

Sources of various fluids such as, for example, a bottle 130 for hydrogen, a bottle 132 for carbon monoxide or carbon dioxide, and a bottle 134 for argon or helium, can be connected to the controlled fluid 6 within the electrolyte tube 112. Each bottle is provided with connecting conduits and with a flow meter and a valve such as the flowmeter 136 and the valve 138 connected to the hydrogen bottle 130. A vacuum pump 140, having a valve 142, may also be connected in fluid communication with the inside of the electrolyte tube 112.

The embodiment of FIG. 3 is operated to provide a controlled gaseous environment within the tube 112 by initially actuating the valves connected to the bottles 130, 132 and 134 to approximate the desired contents within the tube 112. The oxygen activity that is desired within the tube 112 is then chosen by the appropriate command input 114. Oxygen is then removed or added to the controlled fluid 6 by coulometric titration according to the principles stated above.

Figure 4:
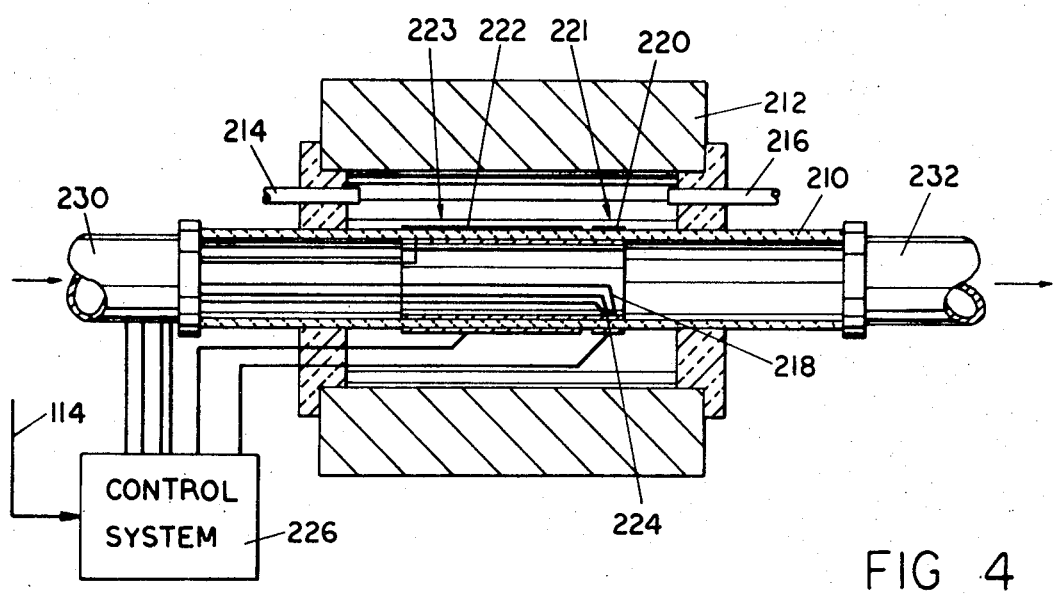
FIG. 4 is a view in side elevation partly in vertical section illustrating an embodiment of my invention for controlling the agent content of a continuous stream of fluid flowing through an electrolyte tube.

FIG. 4 illustrates the preferred embodiment of my invention for controlling the oxygen activity in a continuous flowing stream. This embodiment comprises cylindrical tube 210 having walls of solid electrolyte which is surrounded and heated by a furnace 212 (if necessary—i.e. if heating is not otherwise accomplished) in order to heat the electrolyte cells to the requisite temperature. The furnace is also a container for the reference gas and is provided with a reference gas inlet 214 and a reference gas outlet 216. A cylindrical inner electrode 218 of porous platinum is coated on the inner wall of the electrolyte tube 210, and a cylindrical porous platinum measuring electrode 220, together with a cylindrical porous platinum pumping electrode 222, are coated on the outer wall of the electrolyte tube 210. The measuring electrode 220, and therefore the measuring cell, is positioned downstream from the pumping electrode 222 in order that the control system will detect the oxygen activity in the flowing stream after oxygen has been injected into that stream by the pumping cell. Suitable electrical conductors connect a thermocouple temperature sensor 224 and the electrodes 218, 220, and 222 to the control system 226.

To operate the embodiment of FIG. 4, the same steps are taken as for operation of the previous embodiments. The embodiment of FIG. 4 may be used with liquid, gas, or mixed condensed phases, and if used with a liquid which is an electronic conductor such as molten metal, the inner electrode 218 may be eliminated. Contact with the control system may be made in another part of the stream, such as within the conduit 230, or the conduit 232, which are connected in fluid communication with the electrolyte tube 210.

The embodiment of FIG. 4, as above described, assumes that there will be sufficient diffusion of oxygen which is pumped in through the pumping cell 223 before the pumped oxygen reaches the measuring cell 221. However, in some cases, and particularly with liquid phase controlled fluids flowing through the tube 210, it may be necessary to aid the distribution of the oxygen from the pumping cell into the controlled fluid by, for example, effecting turbulence in the stream in the region of the pumping cell 223. This might be accomplished with the aid of fins or vanes within the flowing stream, by use of a corrugated conduit or electrolyte tube 210, or by vibrating the electrolyte tube 210 while the stream is flowing therethrough. The embodiment of FIG. 4 would be particularly useful for the deoxidation of liquid metals and for the control of oxygen activity in flowing gas streams. Regeneration of hydrogen or CO from steam or $CO_2$ is also possible.

An embodiment of my invention might be easily adapted to measure the reaction rate (kinetics) of an ionizable agent with some other reactant. The embodiment of FIG. 3 would particularly lend itself to such measurements. However, referring to FIG. 1 for clarity, a means such as an ammeter 300 (shown in phantom in FIG. 1)

may be connected in series with the control unit 34 and the pump electrode 28 for measuring the electrical current through the pumping cell 24 and for providing an output response proportional to that current. The reactant, together with the ionizable agent such as the oxygen, are placed within the container 10 and a command input oxygen partial pressure is selected. The apparatus illustrated in FIG. 1 will then operate to maintain a constant selected oxygen content with the container 10 while the reaction occurs. Therefore, the quantity of oxygen moving from outside the container 10 to within the container 10 will equal the quantity of oxygen reacting with the reactant. By Faraday's law, the current indicated on the ammeter 300 will be directly proportional to the rate at which oxygen is being pumped into the container 10. Therefore, the response of the ammeter will be directly proportional to the reaction rate within the container 10. Such an apparatus may be use, for example, for laboratory studies of the rate of reaction of metals and alloys with oxygen or with carbon from a $CO$—$CO_2$ atmosphere, the rate of reduction of an oxide in a reducing gas, or a rate of decomposition.

The mathematical considerations involved in the solid electrolyte cell would be of use to a person designing the control circuitry. I therefore offer the following simplified statements which represent my present theory of the operation of embodiments of my invention. In arriving at these relationships, various assumptions and approximations have been made. They are not intended to necessarily be correct under all conditions but represent solely an attempt to present some operational theories. If the electrolyte is at a temperature range that permits substantially exclusive ionic conduction with relatively negligible electronic conduction, then the correspondence between the voltage E across the electrodes of a galvanic cell and the oxygen partial pressures on opposite sides of the cell may be given by the equation $$e_g = \frac{RT}{4F} \ln \frac{P_1}{P_2}$$

where R is the gas constant which equals 1.9865 cal./mole-° K., temperature is in degree Kelvin, and F is Faraday's constant (23,070 ca./volt-equivalent), $P_1$ is the higher oxygen partial pressure on one side of the partition, and $P_2$ is the lower oxygen partial pressure on the opposite side of the solid electrolyte partition.

For the pumping cell, the total mass of agent $m_A$ transferred through the electrolyte corresponds, by Faraday's laws, to the pumping cell current $i$ by the relationship $$m_A = \frac{itM_A}{96,520Z_A} \text{ grams}$$

where $t$ is time in seconds, $i$ is current in amperes (coulombs per second), $M_A$ is the atomic mass of the agent, and $Z_A$ is the valence of the agent. For oxygen $$M_O = \frac{8ti}{96,520} \text{ grams}$$

The current through the cell is related to the pumping cell voltage and the cell resistance $R_p$ by Ohm's law. The cell resistance $R_p$ depends upon the cell configuration and dimensions and upon the resistivity of the solid electrolyte and can be calculated in the usual manner using the relationship $$R_p = \frac{l}{A\sigma_{ion}}$$

where $l$ is the cell length, A is the cell area, and $\sigma_{ion}$ is the ionic conductivity of the cell which can be measured. For example, the ionic conductivity for CaO doped zirconia comprising $Zr_{0.85}Ca_{0.15}O_{1.85}$ at 1000° C. is 0.025 mhos per centimeter. If a tube similar to the embodiment of FIG. 4 were used which had an internal radius of 0.8 cm., an external radius of 1 cm., and a pumping cell length of 10 cm., it would have a pumping cell resistance $R_p$ of 0.142 ohm. Then, for a voltage of 1 volt between the electrodes, seven amperes would flow through the cell corresponding to the passage through the cell of $5.8 \times 10^{-4}$ gm. oxygen/sec.

The pumping cell will, like a measuring cell, have a voltage across its electrodes even in the absence of significant current flow. This galvanic voltage $e_g$ is due to the difference in agent partial pressure on opposite sides of the cell. When a voltage $e_p$ is impressed across the pumping cell electrodes, the total loop voltage $e_{TOTAL}$ will be the algebraic sum of this galvanic voltage $e_g$ and the impressed pumping voltage $e_p$. The loop current $i$ will then be $$i = \frac{e_{TOTAL}}{R_p} = \frac{e_g + e_p}{R_p}$$

Therefore $$iR_p = e_p + \frac{RT}{4F} \ln \frac{P_1}{P_2}$$

From the above relationships and the gas laws, the control circuit parameters can be designed. I have determined that the maximum efficiently useful $e_{TOTAL}$ is about 1.7 volts because at greater voltages electronic conduction becomes significant and does not further increase oxygen transport through the cell.

Figure 5:
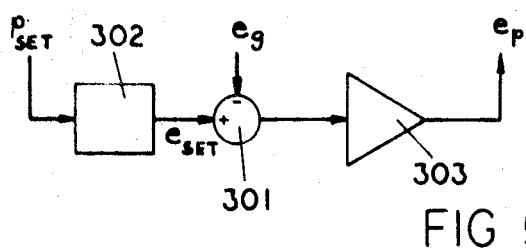
FIG. 5 is a block diagram illustrating an example control means for use in an embodiment of my invention.

From the above relationships, a control system can be designed, and I illustrate one type of control system in FIG. 5 for example purposes. The control means of FIG. 5 has a differential amplifier 301 preceding an amplifier 303. One input to the differential amplifier 301 is a reference voltage $e_{SET}$. The voltage $e_{SET}$ will be derived from a command input $P_{SET}$ by a reference selector 302. The reference selector 302 will have circuit means to derive $e_{SET}$ from $P_{SET}$ according to the relationship.

$$E_{SET} = \frac{RT}{4F} \ln \frac{P_{SET}}{P_{REF}}$$

where $P_{REF}$ is the partial pressure of the reference fluid.

An error signal output from the differential amplifier 301 will be amplified by the amplifier 303 and applied to the pumping cell. Because the maximum efficiently useful $E_{TOTAL}$ is 1.7 volts as stated above, a suitable limiter would preferably be used to limit the output $e_p$ of the amplifier 303 to a few volts.

To accomplish temperature compensation, a voltage $e_{TEMP}$ would be derived from a temperature sensing device so that $$e_{TEMP} = KT$$

where K is a proportionability constant and T is temperature in ° K. Using conventional analog computing elements, the measuring cell voltage $e_g$ would be multiplied by $1/e_{TEMP}$. This multiplication would produce a temperature independent voltage which, in addition to a suitable $E_{SET}$, would be applied to the differential amplifier 301 to provide a temperature independent error voltage.

It is to be understood that while the detailed drawings and specific examples given described preferred embodiments of my invention, they are for the purposes of illustration only, that the apparatus of the invention is not limited to the precise details and conditions disclosed, and that various changes and refinements may be made therein without departing from the spirit of the invention which is defined by the following claims.

I claim:
1. An apparatus for controlling the ionizable agent content of a controlled fluid in response to a command input desired content, the apparatus comprising:
    (a) an impervious solid electrolyte partition separating the controlled fluid from a reference fluid having a measuring cell formed thereon with an electrode at the controlled fluid and an electrode at the reference fluid for providing a voltage on the electrodes proportional to the natural logarithm of the ratio of the agent content of the reference fluid;

(b) an impervious solid electrolyte partition separating said controlled fluid from a reservior fluid having a pumping cell formed thereon with an electrode at the controlled fluid and an electrode at the reservoir fluid for transporting agent through the pumping cell at a rate proportional to the algebraic sum of the galvanic voltage of the pumping cell and a voltage impressed on the electrodes thereof; and (c) feedback control system means electrically connected to the measuring cell and to the pumping cell, the control means including means for providing a command input for a desired agent content for the controlled fluid the command input being an electronic reference voltage, one temperature sensor for providing an electronic temperature signal voltage corresponding to the temperature of said cells, a computing element having inputs connected to the temperature sensor and the measuring cell for providing an output proportional to said measuring cell voltage divided by said temperature signal voltage, the control means providing a pumping voltage at its output and on the pumping cell which is derived from the difference between the command input reference voltage and the output of said computing element for changing the agent content of the controlled fluid toward the desired agent content.

References Cited

UNITED STATES PATENTS

| | | | |
|---|---|---|---|
| 3,400,054 | 9/1968 | Ruka et al. | 204—1 |
| 3,442,773 | 5/1969 | Wilson | 204—195 X |
| 3,514,377 | 5/1970 | Spacil et al. | 204—1 |
| 3,464,008 | 8/1969 | Meysson et al. | 204—195 X |
| 3,468,780 | 9/1969 | Fischer | 204—195 |

GERALD L. KAPLAN, Primary Examiner

U.S. Cl. X.R.

55—2, 16, 101, 158; 204—1 R